United States Patent [19]
Massar et al.

[11] 3,804,023
[45] Apr. 16, 1974

[54] DYNAMIC-MAGNETIC SUSPENSION SYSTEM FOR A CONVEYANCE BOUND TO A GUIDE STRUCTURE

[75] Inventors: Ernst Massar, Erlangen; Gunther Bogner, Tennenlohe, both of Germany

[73] Assignee: Siemens Aktiengesellschaft, Munich, Germany

[22] Filed: Apr. 28, 1972

[21] Appl. No.: 248,385

[30] Foreign Application Priority Data
Apr. 30, 1971  Germany............... P 21 21 247.5

[52] U.S. Cl. ..................... 104/148 SS, 310/40 R
[51] Int. Cl. ..................... B61b 13/08, H01f 7/00
[58] Field of Search ...... 310/10, 40 R, 52; 335/216; 104/148 SS

[56] References Cited
UNITED STATES PATENTS
3,470,828  10/1969  Powell, Jr. et al............ 104/148 SS
3,521,091  7/1970  Halas .............................. 310/40 R Primary Examiner—Gerald M. Forlenza
Assistant Examiner—George H. Libman
Attorney, Agent, or Firm—Kenyon & Kenyon Reilly Carr & Chapin

[57] ABSTRACT

A dynamic-magnetic suspension system for a conveyance bound to a guide structure is disclosed. The system includes a superconductive excitation winding disposed on the conveyance for generating a magnetic field. A plurality of conductor loops are disposed in the guide structure to interact with the magnetic field for suspending and guiding the conveyance with respect to the guide structure. The conductor loops are arranged as a multiphase winding extending in the direction of motion of the conveyance. The excitation winding induces a substantially sinusoidal voltage in the conductor loops which travels at the speed and in the direction of motion of the conveyance.

18 Claims, 6 Drawing Figures

DYNAMIC-MAGNETIC SUSPENSION SYSTEM FOR A CONVEYANCE BOUND TO A GUIDE STRUCTURE

BACKGROUND OF THE INVENTION

The invention relates to a dynamic-magnetic suspension system for transportation equipment bound to a guide structure or roadbed. More particularly, the invention relates to such a system wherein the conveyance is equipped with a superconductive magnetizing means and conductor means are disposed in the guide structure. The conductor means can be influenced by the magnetic field of the magnetizing means so as to constitute a suspension guide of the vehicle.

Magnetic suspension bearings are known for machines from bearing and transportation technology. In transportation technology and particularly in the area of railroad engineering, particular attention is given to the so-called electrodynamic or dynamic-magnetic suspension technique, this being in addition to permanent-magnet and the electromagnetic techniques. In the electrodynamic or dynamic-magnetic suspension technique, the repelling force is obtained by the countercirculating currents of two conductor loops disposed parallel to each other. A primary loop is installed on the vehicle. The roadbed also has loops, which are arranged as secondary loops, one behind the other in the roadbed, as seen in the direction of motion. The primary loop, through which the current flows, generates through its motion a current in the secondary which first increases approximately with the velocity and is constant at higher speeds. The product of both currents is proportional to the lifting force.

In known dynamic-magnetic systems, the reaction of the conductor loops disposed in the guide structure on the excitation loop and the excitation field has previously been considered as being only of secondary importance. However, such reaction cannot be overlooked, especially when using a superconductor in the excitation system; since, this leads in the event of rapid current changes, but particularly when alternating-current components are present, to hysteresis losses in the superconductor, and to eddy current losses in the material surrounding the superconductor, this material being primarily copper.

SUMMARY OF THE INVENTION

It is an object of the invention to provide a dynamic-magnetic suspension system of kind referred to above which achieves a dynamic-magnetic suspension guidance of the transporting means along the travel path free of undesired reactions between the induced system and the excitation system or the consequences of such reactions.

Subsidiary to this object, it is an object of the invention to provide a suspension system which achieves such a dynamic-magnetic guidance with simple means and with small electrical losses compared to those suspension guides already mentioned.

A dynamic-magnetic suspension is provided for a conveyance bound to a guide structure for guiding the conveyance along a given direction of motion.

According to a feature of the invention, conductor loop means are arranged in the guide structure as a multi-phase winding which can be a three-phase winding for example. The multi-phase winding can extend in the direction of motion. Superconductive magnetization means comprising an excitation winding is also provided in such a manner that a largely sinusoidal voltage is induced in the conductor loop means which travels in the direction of motion at the velocity of the conveyance. According to another feature of the invention, the conductor loop means can comprise a plurality of short-circuited conductor loops arranged so as to constitute the multi-phase winding.

In contrast to the known dynamic-magnetic suspension system, in the system of the invention, largely sinusoidal induced voltages are generated in the short-circuited conductor loops disposed in the guide structure and sinusoidal current distributions occur which always travel in the direction of motion at the velocity of the conveyance accompanied by corresponding sinusoidal flux waves which contain only a small amount of harmonics as compared to known electrodynamic suspension systems. With the system of the invention, the small amount of harmonics leads to the condition that no power-consuming and high loss fields occur in the direction opposite to the motion of the conveyance or with velocities different from the fundamental-wave velocity.

According to another feature of the invention, it is practical to configure the excitation winding as a distributed winding with poles disposed one after the other in the direction of motion. Each two mutually adjacent poles constitute a pole pair and have respectively opposite directions of magnetization so that the arrangement of poles develops a largely sinusoidal field excitation curve corresponding to a pole pair. It is further advantageous to provide on the conveyance several successive pairs of poles as seen in the direction of motion.

To counteract undesirable reactions of the short-circuited conductor loops in the guide structure on the excitation winding, the reactions being caused by induced transient currents for example, a shielding means in the form of a shielding winding similar to the excitation winding with a coil pitch preferably coincident with that of the latter is arranged on the conveyance. The shielding effect can be increased further by arranging the shielding winding in a deep-cooled zone of the cooling zone or pre-cooling zone which is already available for the cooling of the superconductor. In this deep-cooled zone, the material of the winding has higher electric conductivity because of the lower temperature. If required, to reduce any alternating current components in the excitation winding which may be present to negligible values, a superconducting choke can be inserted into the circuit ahead of the excitation winding.

It is still a further feature of the invention to provide a damper winding configured in the manner of a cage winding on the conveyance; this cage winding has continuous conductors extending at the longitudinal sides of the conveyance outside the longitudinal sides of the rest of the winding system. Transverse conductors connect the continuous conductors at a mutual spacing small compared to the coil pitch of the rest of the winding system.

If a particularly simple configuration is to be achieved, this winding may also be replaced by a metal plate of the same outer dimensions. It is advantageous to arrange this damper winding or damper plate in the ambient-temperature region.

Although the invention is illustrated and described herein as a dynamic-magnetic suspension system for a conveyance bound to a guide structure, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

Embodiments of the dynamic-magnetic suspension system according to invention are illustrated in the following five figures described below. Similar or like components are designated by the same reference numeral in each figure in which they appear.

DESCRIPTION OF THE PREFERRED EMBODIMENTS

Figure 2:
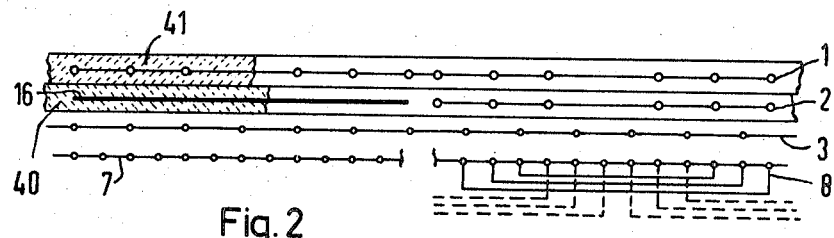
FIG. 2 illustrates, partially in section, a front view of the winding portions of FIG. 1.
Figure 3:
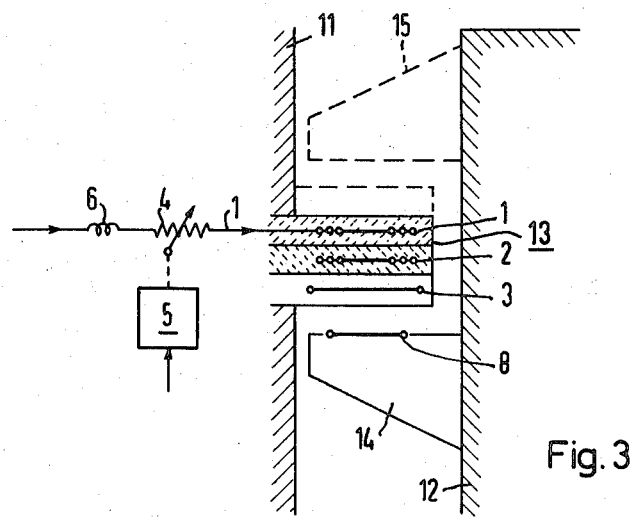
FIG. 3 is an elevation view showing the individual windings of the system and their relation to the conveyance and the guide structure.

Referring first to FIG. 3, the suspension system of the invention is applied to a rapid-transit, self-propelled car or drive vehicle having a longitudinal side 11 with a winding support 13 shown in side view. On the guide structure or roadbed 12 there are likewise provided winding supports 14 and 15 wherein, for the illustrated example according to FIGS. 1 to 3, only the lower support 14 is equipped with windings.

Figure 1:
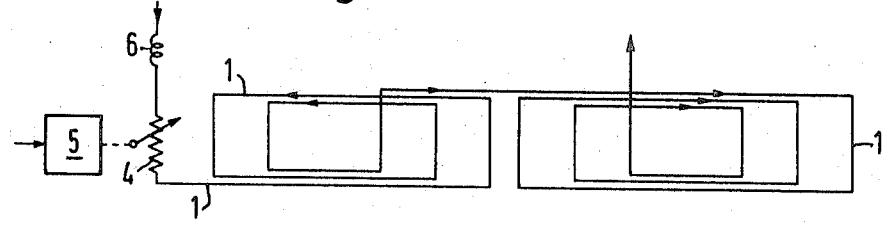
FIG. 1 is an expanded plan view illustrating individual winding portions of the system along a double pole pitch.
Figure 1:
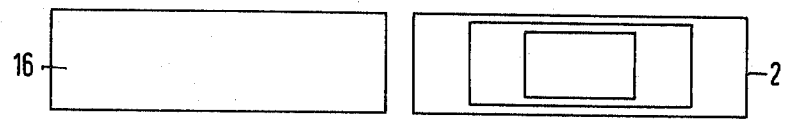
Figure 1:
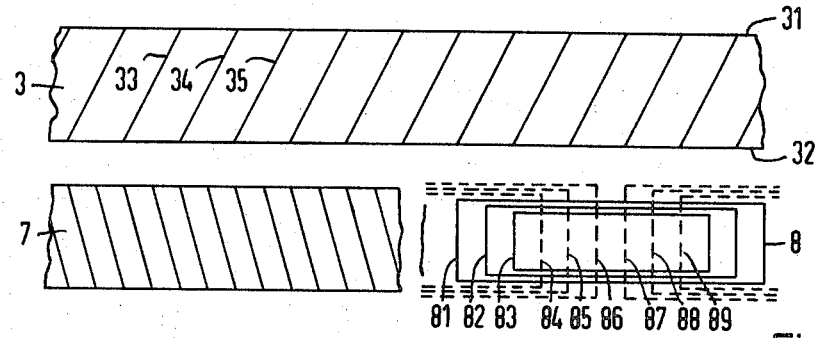

On the winding support 13 are disposed the excitation winding proper 1, shield winding 2 and cage winding 3. The short-circuited roadbed conductor loops 81 to 89 are illustrated in the lower portion of FIG. 1 and are disposed in the lower support 14 of the roadbed 12. The conductor loops 81 to 89 are configured and connected as a three-phase alternating current winding with respective phases designated R, S, T. The three-phase windings extend in the direction of movement of the drive vehicle. FIGS. 1 and 2 illustrate the winding configuration for one pole pitch wherein the coils are of various coil pitches. In lieu of the illustrated winding, a three-phase alternating current winding known per se and having respective like coil pitches can be used.

Figure 4:
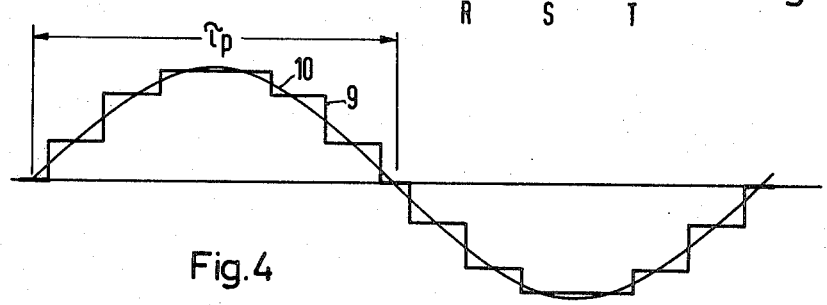
FIG. 4 illustrates the approximate course of the field excitation curve of a pole pair of the excitation winding arranged as depicted in FIGS. 1 and 2.

The excitation winding 1 is built-up as a distributed winding with poles of opposite direction of magnetization alternating and following each other in the direction of motion in such a manner that with the number of coils 3 assumed here, the shape of the field excitation curve 9 of a pair of poles of the excitation winding 1 shown in FIG. 4 results. With a larger number of coils and, if needed, by making the sides of the coils inclined, a better approximation of the field excitation curve to the sinusoidal form 10 can be achieved. Excitation winding 1 is a superconductive winding and is preferably maintained at a temperature of 4.2° K by suitable cooling means 41.

The shielding winding 2 is constructed, like the excitation winding 1, as a damper winding which preferably agrees with the winding 1 with respect to coil pitch and number of turns, as indicated in the right-hand part of the winding in FIGS. 1 and 2. If a particularly simple configuration is to be achieved, the shielding winding may also be constructed in the manner of a cage winding which agrees with respect to the number of bars, preferably, with respect to the number of coil sides of the excitation winding 1. Or, the shielding winding can be configured as a continuous metal plate 16 having the same width as the shielding winding 2, as is shown in the left-hand portion of FIGS. 1 and 2.

The damper winding proper 3 is built-up in the manner of a cage winding with continuous conductors 31 and 32 that extend outside of the longitudinal sides of the other windings 1 and 2. The transverse conductors 33, 34, 35 etc., connect the conductors 31 and 32 and are mutually spaced at a distance which is small compared to the coil pitch of the other windings 1 and 2. To increase the number of phases of the winding 8 advantageously, this winding can also be constructed in the manner of a cage winding 7 and connected accordingly. In the damper winding 3 as well as in the cage winding 7, the transverse connections between the respective longitudinal conductors are advantageously arranged inclined with respect to the direction in which they are distributed. If according to FIG. 3, winding supports are provided on both sides of the vehicle with corresponding windings thereon, it is practical to make the inclination of the bars on the one side of the vehicle the mirror image of the bars on the other side of the vehicle, so that transverse forces that could possibly occur are mutually cancelled.

A choke 6 is connected ahead of the excitation winding 1. In the circuit of the superconducting excitation winding 1 there is further provided at least one adjustable resistor 4. The ohmic resistor 4 can be adjusted in dependence on the control device 5 in such a manner that a definite excitation current is obtained. The resistor 4 need not be provided here as a separate resistor, but can advantageously be provided in the form of a rheostat installed on the drive vehicle.

If according to FIG. 3, the winding support 15, in addition to the support 14, is equipped with short-circuited conductor loops, it is practical to provide on the drive vehicle winding support 13, further shielding windings and damper windings, each of which is arranged symmetrically to the centrally disposed excitation winding 1 on both longitudinal sides of the vehicle. If on each winding support along the two longitudinal sides of the vehicle, at least one cage winding with inclined cross bars is provided, it is practical to make the inclination of the two cage windings as mirror images with respect to the longitudinal axis of the drive vehicle in such a manner that transverse forces that could possibly develop because of the inclination of the bars are mutually cancelled.

Figure 5:
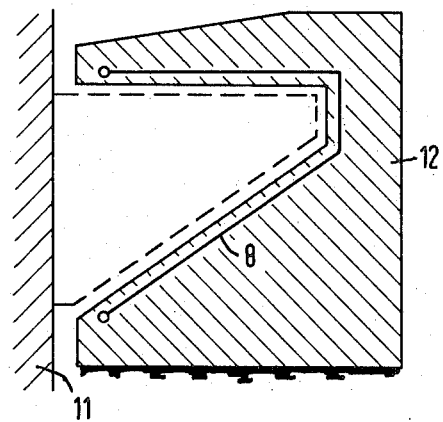
FIG. 5 is a special arrangement of the winding portion of the system disposed in the guide structure.
Figure 6:
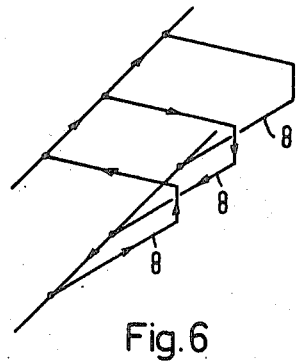
FIG. 6 illustrates the current flow in the winding portion of FIG. 5.

The conductor loops respectively arranged in the upper and lower winding supports 14 and 15 of the roadbed may consist of winding loops each short-circuited upon itself, however, it is also possible to combine both loops in one overall short-circuit loop according to FIG. 5. FIG. 6 shows the path of the current which then occurs in the short-circuited conductor loops of the roadbed. With the so-called "null system arrangement" detailed in FIGS. 5 and 6, the electric losses can be further reduced.

Because of the configuration of the excitation winding 1 with a distributed winding and sinusoidal field excitation curve, a voltage varying sinusoidally with time is induced in each of the windings R, S, T upon movement at constant velocity with respect to the stationary winding 8. According to the properties of the three-phase system (R, S, T), the short-circuit currents produced are also displaced in time with respect to each other by 120 electrical degrees. A current distribution develops which has an amplitude oscillating between two limits and which is of approximately sinusoidal shape. The current distribution travels at the speed of the generating system in the direction of motion. After a minimum velocity of the drive vehicle has been reached, only the stray reactances of the winding 7 or 8 have any effect; these reactances are caused by fluxes which are not linked with the excitation winding 1 and which originate about the current-carrying conductors. The current induced in the winding 8 lags the voltage values by 90 electrical degrees in time in such a manner that for constant velocity, the current distribution also is spatially displaced by the same angle, so that a phase displacement of 180° exists with respect to the excitation current distribution. Both current distributions and their field excitation curves are of opposite direction and generate a repelling force perpendicularly to the plane of the winding, which keeps the drive vehicle in suspension.

The discussion above was based on steady-state conditions, for which the curve $i_{ind} = f(t)$ of the current $i_{ind}$ induced in the individual short-circuited conductor loops of the roadbed is symmetric with respect to the time axis and is therewith distributed uniformly in the positive and negative region. However, if the first excitation windings located at the head of the drive vehicle move over the winding 8 or 7, effects occur in these winding portions which are comparable to those in a synchronous machine which is suddenly short-circuited in the excited condition. Consequently, transient components of direct-current occur in the winding 8 as well as in the excitation winding 1 which decay in accordance with the time constant of the respective winding. If constant velocity of the drive vehicle is assumed, the electrical phenomena that are representable as plot along a time axis appear in a similar manner in space for the winding 8 or 7. The electrical phenomena can therefore be plotted along the axis of motion as well as along the time axis in the same configuration.

From such a representation it is seen that the current distribution in the winding 8 or 7 is displaced unilaterally with respect to the zero axis (motion or time axis) by the amount of the transient direct-current term or component. Only after several pole pairs of the drive vehicle have moved over the respective turns of the winding 8 or 7, will the transient portion of the current distribution have essentially decayed, so that under the pole pairs of the drive vehicle which subsequently pass over, will the steady state occur in the portion of the winding in question. Since the current distributions of the excitation windings 1 and of the winding 7 or 8 in the roadbed form stray fields almost entirely because of the short-circuited condition (that is they form essentially no common flux) and because these current distributions repel each other because of their mutually opposite phases, the corresponding forces or more particularly, the lifting forces, can be determined with sufficient accuracy by multiplying the respective local values of both current distributions.

Since the superconducting excitation winding 1 in the short-circuited state has an infinitely large time constant $T = L/R$ (because of $R = 0$), the transient direct-current components decay very little or not at all in this winding. Advantageously, an adjustable resistor 4 is connected into the circuit of the excitation winding 1. This resistor 4 is controlled in dependence upon an excitation current control device 5 and, by means of which, the excitation current can be adjusted to a desired definite value, for example, a constant value by utilizing the induced transient currents. According to a special embodiment, the adjustable resistor 4 may consist of an existing consumer rheostat on the drive vehicle.

If no use or only limited use is to be made of the transient currents induced in the excitation winding 1, as just described, it is advantageous to provide the shielding winding 2 or the shielding plate 16 shown in the drawing. It shields the excitation winding 1 from the flux changes originating in the short-circuited conductor loops of the roadbed, and takes over the corresponding current changes. To improve the shielding effect, the shielding means in the form of the shielding winding 1 or the shielding plate 16 is advantageously cooled to a low temperature to reduce the resistance. For this purpose the shielding means is situated in a zone 40 of the thermal insulation at which a substantially lower temperature prevails than in the ambient surroundings. The shielding means is advantageously combined with a radiation shield cooled with liquid nitrogen at a temperature of about 70° K.

Residual alternating-current components may still be present in the excitation winding 1 and can be produced because of the movement of the excitation windings at the velocity of the drive vehicle over the current-carrying, short-circuited conductor loops in the roadbed. To reduce these alternating-current components to insignificant values, the superconducting choke 6 is connected into the circuit ahead of the excitation winding 1. The damper winding 3 not only takes up alternating-current components of the field, but also dampens step-wise load changes perpendicular to the plane of the winding. The damper winding therefore has a deinite resistance value and is advantageously located in the region of the ambient temperature for good cooling in the air stream of the moving drive vehicle.

What is claimed is:

1. Dynamic-magnetic suspension system for a conveyance bound to a guide structure for guiding the conveyance along a given direction of motion, comprising superconductive magnetization means disposed on said conveyance for generating a magnetic field, and conductor loop means disposed in the guide structure for interacting with said magnetic field for suspending and guiding the conveyance with respect to the guide structure, said conductor loop means being a multi-phase winding extending in the direction of motion of the conveyance, said super-conductive magnetization means including an excitation winding configured so as to produce a substantially sinusoidal-shaped magnetic field for inducing a substantially sinusoidal voltage in said conductor loop means which travels at the speed and in the direction of motion of the conveyance.

2. Dynamic-magnetic suspension system for a conveyance bound to a guide structure for guiding the conveyance along a given direction of motion, the conveyance having two sides adjacent respective longitudinally extending portions of the guide structure, the system comprising superconductive magnetization means disposed on said conveyance for generating a magnetic field, and conductor loop means disposed in the guide structure for interacting with said magnetic field for suspending and guiding the conveyance with respect to the guide structure, said conductor loop means being a multi-phase winding extending in the direction of motion of the conveyance, said multi-phase winding comprising a plurality of short-circuited conductor loops arranged in the form of a projected cage winding having a given pole pitch, said cage winding comprising at least one longitudinal conductor disposed in each of said portions in proximity to respective sides of the conveyance and extending in the longitudinal direction of the guide structure, and at least three transverse conductors connected across said longitudinal conductors per pole pitch, said superconductive magnetization means including an excitation winding for inducing a substantially sinusoidal voltage in said multi-phase winding which travels at the speed and in the direction of motion of the conveyance.

3. The suspension system of claim 1, said conductor loop means comprising a plurality of short-circuited conductor loops arranged so as to constitute said multi-phase winding extending in the direction of motion of the conveyance.

4. The suspension system of claim 1, said conductor loops being arranged in the guide structure so as to constitute a three-phase winding.

5. The suspension system of claim 3, said excitation winding being a distributed winding and having a plurality of poles disposed one after the other in the direction of motion, each two mutually adjacent poles constituting a pole pair and having respectively opposite directions of magnetization so as to produce a substantially sinusoidal-shaped field excitation curve corresponding to said pole pair.

6. The suspension system of claim 5, said plurality of poles being disposed on the conveyance.

7. The suspension system of claim 3 comprising shielding means for shielding said excitation winding against flux changes originating in said short-circuited conductor loops.

8. The suspension system of claim 7, said shielding means being a shielding winding disposed on the conveyance, said shielding winding corresponding to said excitation winding.

9. The suspension system of claim 8 wherein said excitation winding has a given coil pitch, and wherein said shielding winding has a coil pitch equal to said coil pitch of said excitation winding.

10. The suspension system of claim 7, said shielding means being a shielding plate disposed on the conveyance, said shielding plate being a continuous metal plate and having peripheral dimensions corresponding to the peripheral dimensions of said excitation winding.

11. The suspension system of claim 3, said superconductive magnetization means comprising a superconductive choke connected ahead of said excitation winding.

12. The suspension system of claim 3 wherein said excitation winding has a given pitch and wherein the system comprises a damper winding disposed on the conveyance and having the form of a projected cage winding, said damper winding comprising continuous longitudinal conductors extending along the longitudinal side of the conveyance and spaced from the longitudinal side of said excitation winding, and transverse conductors connected across said longitudinal conductors, said transverse conductors being respectively spaced with a spacing small relative to said coil pitch of said excitation winding.

13. The suspension system of claim 12, said damper winding being disposed on the conveyance so as to be at ambient temperature.

14. The suspension system of claim 7 comprising cooling means for maintaining said excitation winding at superconductive temperatures, said shielding means being disposed in a zone of said cooling means.

15. The suspension system of claim 3 wherein said excitation winding of said superconductive magnetization means is a superconductive winding and wherein said superconductive magnetization means comprises an adjustable resistor serially connected to said excitation winding.

16. The suspension system of claim 15, said superconductive magnetization means comprising an excitation current control device connected to said adjustable resistor for adjusting the latter.

17. The suspension system of claim 15, said resistor being a consumer rheostat of the conveyance.

18. The suspension system of claim 16, said resistor being a consumer rheostat of the conveyance.

* * * * *